Nov. 11, 1969     H. D. HELLMERS     3,477,808
PROCESS FOR THE PRODUCTION OF DENSE SODIUM CARBONATE
FROM TRONA AND APPARATUS THEREFOR

Filed April 13, 1966     2 Sheets-Sheet 1

*INVENTOR.*
HENRY D. HELLMERS
BY *John P Haggard*

United States Patent Office 3,477,808
Patented Nov. 11, 1969

3,477,808
PROCESS FOR THE PRODUCTION OF DENSE SODIUM CARBONATE FROM TRONA AND APPARATUS THEREFOR
Henry D. Hellmers, Westend, Calif., assignor to Stauffer Chemical Company, New York, N.Y., a corporation of Delaware
Filed Apr. 13, 1966, Ser. No. 542,394
Int. Cl. C01d 1/22; C01b 31/24
U.S. Cl. 23—63
4 Claims

ABSTRACT OF THE DISCLOSURE

Apparatus for monohydrating hot crude sodium carbonate having a delivery conduit for the delivery of hot crude sodium carbonate by gravity to a dissolver unit and a spray collar so constructed and positioned about the delivery conduit so as to form a small opening therebetween. The apparatus also has a plurality of spray nozzle circumferentially positioned on the underside of the spray collar and directed downwardly so as to spray a stream of hot crude sodium carbonate leaving the delivery conduit with a spray of aqueous solution of sodium carbonate. The solution of sodium carbonate is sprayed with sufficient force so that a down-draft of air is drawing through the opening thus prohibiting steam produced in the dissolution of hot crude sodium carbonate from contacting the delivery conduit. The process covers the delivering and spraying steps in the operation of the above apparatus.

Figure 1:
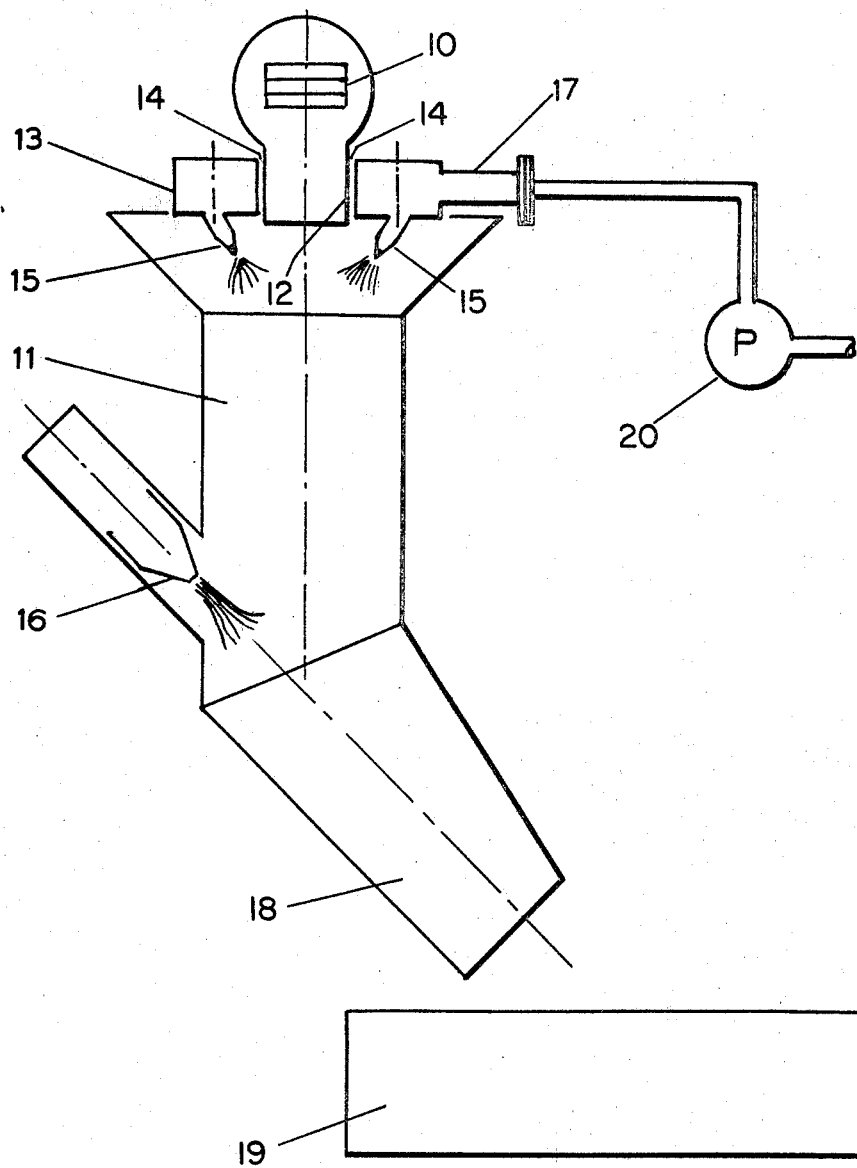

This invention relates to apparatus and process useful in the production of dense sodium carbonate from trona. More particularly, this invention relates to an improved feeder system for introducing calcined trona into a dissolver unit. Also provided for in this invention is a process for effectively hydrating the calcined trona prior to introducing the sodium carbonate into a dissolver unit.

Typical crude trona is mainly sodium sesquicarbonate with trace amounts of sodium chloride, sodium sulfate, ferric oxide, organic matter and certain insolubles. In general, crude trona is processed to crude sodium carbonate by calcining and converting the sodium bicarbonate present in the crude trona to sodium carbonate. Overall the crude sodium carbonate is dissolved in water and crystallized from the mother liquor as sodium carbonate monohydrate. The monohydrate is further calcined to produce dense soda ash. The mother liquor from the crystals is recycled to the evaporator or other points in the process.

The present invention finds special utility in the processing of crude trona ore in the preparation of soda ash. Crude dry-mined trona may be prepared for calcination by crushing the mined trona and passing it over a screening device or other suitable separating equipment, whereby particles in the general size range of ¼ to 1 inch are collected and passed to the calciner. The ultimate particle size employed will depend upon such factors as temperature of the calciner, residence time in the calciner, and the like. The smaller particle size is preferred. Rejected oversize particles then may be recycled to the crushing apparatus for further sizing. Proper sizing of the crude trona insures conversion of sodium bicarbonate to sodium carbonate during the calcination.

The calcination may be carried out at temperatures of about 200° C. to about 800° C. Since impure sodium carbonate will begin to fuse at temperatures in excess of 800° C., 800° C. is chosen as an upper limit. A rotary, direct fired calciner may be used although other type kilns such as a vertical kiln or grate-type calciner are equally suitable. The retention time of the crude trona in the calciner is a function of temperature.

From the calciner the sodium carbonate is introduced into a dissolver in which the sodium carbonate is taken up in solution prior to crystallization as a pure product. The dissolver unit is supplied with sufficient water or unsaturated sodium carbonate solution to dissolve all the sodium carbonate in the calcined ore. The effluent from the dissolver which is a solution of sodium carbonate, plus suspended insolubles, is then passed to a clarifier where the insolubles are removed. If a small amount of solid matter remains suspended in the liquor after clarification, it may be further filtered to remove the remaining insolubles. The liquor saturated with sodium carbonate is then passed to crystallizing equipment. From the crystallizing area the crystals of sodium carbonate monohydrate and mother liquor are passed to a recovery area wherein the crystals are separated from the mother liquor. The crystals may be washed to remove any residual mother liquor. The mother liquor is recycled to other points in the process.

It is known that if the hot sodium carbonate from the calciner is introduced immediately into water where there results a large amount of steam aid uncontrolled violent agitation from the production of the steam. Also the sodium carbonate treated in this manner often agglomerates and forms large, difficult to dissolve masses. In order to overcome these difficulties, certain processes have resorted to cooling the crude calcined sodium carbonate. However, it would be more desirable, less time consuming and more economical to be able to use the hot calcined trona directly. Several factors are involved in the production of the steam and violent splattering of the solution. The first factor is the entry of hot material into a relatively cool aqueous solution in the dissolver. The second factor is the heat produced from the exothermic hydration reaction in the formation of the monohydrate of sodium carbonate. The third factor is the heat of solution emitted when the sodium carbonate monohydrate is dissolved. All of these factors are sources of heat in the formation of steam during the dissolution of hot sodium carbonate. The steam thus produced has a tendency to rise and to condense on the sodium carbonate delivery means to the dissolver. The presence of moisture on the delivery means causes sodium carbonate to agglomerate and adhere to the delivery means. After a short period of time the build-up of sodium carbonate interferes with the discharge of further sodium carbonate from the calciner to the dissolver unit.

It is an object of this invention to provide an improved apparatus for the introduction of hot crude sodium carbonate from a calciner into a dissolver unit in the process for preparing sodium carbonate from trona, whereby steam is prohibited from contacting the delivery means from the calciner, thereby eliminating agglomeration and blockage of the delivery means by the crude sodium carbonate.

Another object is to provide an improved process for hydrating hot crude sodium carbonate.

Other objects will become apparent from the description and discussion to follow.

The above objects are accomplished by contacting hot crude sodium carbonate immediately upon discharge from a calciner with saturated sodium carbonate solution and providing therein a means for a forced air draft wherein the steam produced in the dissolution of the hot crude sodium carbonate is prohibited from contacting the delivery means.

The improved apparatus of the invention comprises a substantially vertical delivery means for the hot sodium carbonate and positioned therearound a complementary spray collar whose central opening is of slightly larger cross-sectional area than the delivery means so that an opening exists therebetween; a plurality of spray nozzles positioned on the underside of the spray collar and angularly disposed as to cooperate with the delivery means and said opening between the delivery means and the spray collar, to create an aspirator effect, thereby forcefully drawing air down the opening when saturated sodium carbonate solution is discharged at a sufficient force through said spray nozzles with the effect of causing a sufficient down draft around said delivery means to keep any steam formed in the hydration of the crude sodium carbonate from rising to contact said delivery means. The wetted and hydrated crude sodium carbonate is deposited in a dissolver unit. Deposition may be by mechanical means, as by a moving conveyor, or preferably by gravitational means, as for example either free fall or a chute. Further volumes of liquor may be introduced at subsequent intervals following the delivery means and spray collar, as required to supply process requirements or to assist flushing the chute.

FIGURE 1 shows a particular and preferred embodiment of the invention. The hot crude sodium carbonate is discharged from a calciner by delivery means, such as a conveyor 10. The crude sodium carbonate is to be deposited in a dissolver unit 19. Interposed therebetween is an offset chute arrangement having a vertical casing 11. Concentrically positioned at the opening of said vertical casing and between the walls thereof is a delivery conduit 12 extending into said casing. Positioned around said conduit 12, substantially at the delivery end thereof, is a complementary spray collar 13 of slightly larger cross-sectional area so that an opening 14 exists between the spray collar and the delivery port 12. Said spray collar 13 being a hollow tubular construction with a fluid inlet pipe 17. A plurality of fluid spray nozzles 15 are circumferentially disposed on the underside of said spray collar 13. Said fluid spray nozzles 15 are angularly directed downwardly and inwardly in close proximity of the lower exit portion of said delivery conduit 12, but slightly below said delivery conduit so that the sprayed solution does not impinge on the delivery conduit 12. Pump 20 returns saturated sodium carbonate solution from a subsequent step in the process to the chute. The arrangement is such that as the hot crude sodium carbonate enters the chute by means of the delivery conduit 12, saturated sodium carbonate is sprayed thereon at a sufficient force from the spray nozzles 15 on the underside of the spray collar 13 causing a forceful draft of air by means of an aspirator-effect to be drawn down the annular opening 14 surrounding the delivery conduit 12 with sufficient force to prohibit the steam formed from the simultaneous hydration of the hot crude sodium carbonate to come in contact with said delivery conduit. Thereby the hot crude sodium carbonate is wetted and hydration of the sodium carbonate immediately begins and the steam produced is prohibited from contacting the delivery conduit. The wet hydrated material in a slurry falls into a dissolver unit.

Provision is made for an auxiliary spray nozzle 16 in the periphery of the chute casing and passing angularly therethrough. It is preferred that the spray nozzles be mounted in a recessed housing and be aligned with the axis of the offset chute exit 18. Thereby the fluid dispersed from the spray nozzle will effectively wash the chute exit and aid in keeping the chute exit cleared of any agglomerated sodium carbonate monohydrate.

Figure 2:
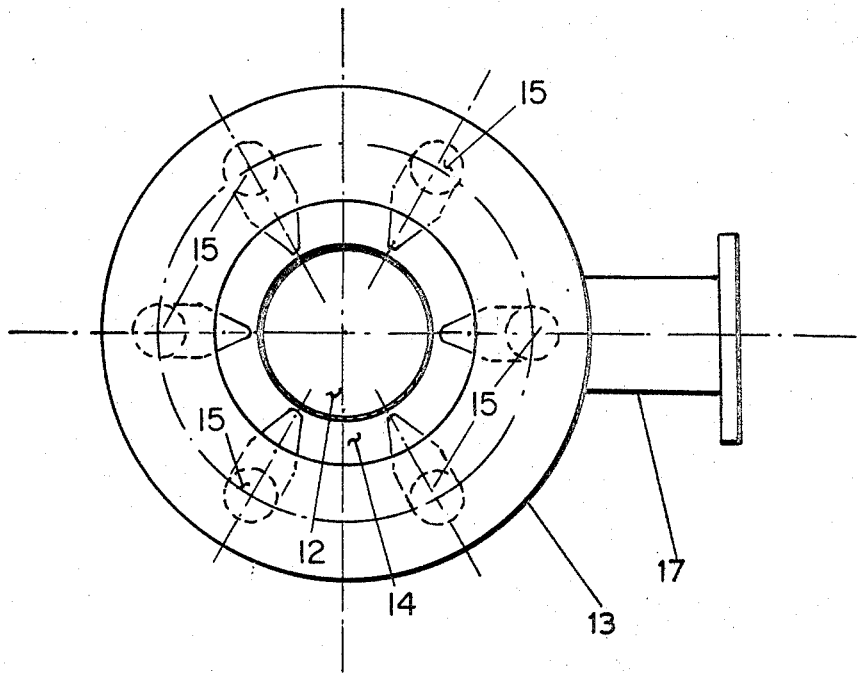

FIGURE 2 illustrates the arrangement at the entrance to the chute housing. Incorporated therein is the spray collar 13 annularly disposed around the delivery conduit 12. Said delivery conduit 12 of slightly less cross-sectional dimension than the spray collar so as to leave an opening 14 between said delivery conduit 12 and said spray collar 13. An inlet pipe 17 supplies the saturated sodium carbonate solution to be sprayed from the spray nozzles 15 circumferentially disposed under the spray collar 13 and angularly directed toward the lower exit portion of the delivery conduit. The spray nozzles are in close proximity to the delivery port exit but slightly below so arranged that sprayed solution does not impinge on the delivery port exit. As the hot crude sodium carbonate enters the chute housing through the delivery conduit 12 and saturated sodium carbonate solution is sprayed on to the crude sodium carbonate from the spray nozzles 15 hydration of the sodium carbonate begins, producing steam. By an aspirator-effect, induced by the force of the flow of solution being discharged from the spray nozzles, air is drawn down the annular opening 14 surrounding the delivery conduit 12 and prohibits the steam from rising and contacting the delivery conduit.

The process that is initiated as the saturated sodium carbonate is sprayed on the hot crude sodium carbonate according to the present invention is the hydration of sodium carbonate. The product, sodium carbonate monohydrate, in its formation emits considerable heat; this heat produces steam. Steam, normally produced in the dissolver unit when hot crude sodium carbonate is directly introduced therein, results from the exothermic heats of hydration and solution of the sodium carbonate. By employing the present invention interposed between the delivery means from the calciner and the dissolver unit the heat produced by the hydration of sodium carbonate is separated from the heat of solution which occurs later in the dissolving unit. Therefore, by employing the process herein described the steam produced in the dissolution of hot crude sodium carbonate can be effectively controlled and all safety hazards and operating difficulties are eliminated.

Broadly considered the invention is dependent upon the relative positioning of the delivery port exit to the spray nozzles. The spray nozzles must be as close as possible but slightly below the delivery port exit and so positioned that the sprayed solution will not impinge upon the delivery port but will thoroughly and effectively wet the crude sodium carbonate exiting the delivery port and produce a sufficient downward draft of air around the delivery port to halt the contact of steam on the delivery port.

Preferably the vertical delivery port should extend a minimum distance through the opening of the spray collar so that full advantage may be taken of the concentrated downward force of air drawn in around the delivery port by the aspirator-effect produced by the spray discharged by the spray nozzles near the delivery port exit. Similarly, it is preferred that the opening 14 between the delivery port 12 and the spray collar 13 be within the range of about ½ inch to about 2½ inches. The gross flow rate of the spray nozzles will depend upon the opening 14, such that the force of the flow rate will be sufficient to cause a sufficient draft of air to prohibit the rise of steam toward the delivery port. It is preferred to employ a sufficient number of spray nozzles such that there is no area surrounding the delivery port where a sufficient downward air draft is not present to inhibit the contact of steam and the delivery port. Steam produced in the further dissolution of the hydrated sodium carbonate in the dissolving tank is prohibited from contacting the delivery conduit by the function of the apparatus herein described.

The primary advantages, therefore, of the present invention are the rapid wetting of hot crude sodium carbonate and effective hydration thereof; and the elimination of steam produced in the hydration of sodium carbonate from contacting the delivery means and thereby preventing agglomeration of the crude sodium carbonate in the delivery means which would result in blockage of the delivery means. The former is accomplished by spraying hot crude sodium carbonate with saturated sodium carbonate solution. The latter advantage is accomplished by utilizing the flow of the sprayed solution to induce a forced air draft, as by an aspirator-effect, around the delivery means exit to inhibit the steam produced in the hydration of the crude sodium carbonate from contacting the delivery means.

Various changes and modifications may be made without departing from the spirit and scope of the invention described herein as will be apparent to those skilled in the art to which it pertains. It is accordingly intended that the present invention shall only be limited by the scope of the appended claims.

I claim:
1. Apparatus useful in the preparation of sodium carbonate from trona ore when interposed between a delivery means from a calciner and a dissolver means, said apparatus comprising:
  a substantially vertical delivery conduit for the delivery of hot crude sodium carbonate by gravity,
  a spray collar having a central opening of a cross-sectional area slightly greater than the delivery conduit, said spray collar concentrically positioned around said delivery conduit substantially at the delivery end thereof so as to form an opening between said spray collar and said delivery conduit,
  a plurality of liquid spray nozzles circumferentially disposed on the underside of said spray collar and directed downwardly and inwardly in close proximity of the exit end of said delivery conduit, so constructed that as saturated sodium carbonate solution is sprayed with sufficient force from said spray nozzles a forceful draft of air is drawn through said opening between said delivery conduit and said spray collar so as to prohibit steam produced in the dissolution of hot crude sodium carbonate from contacting said delivery conduit.

2. The apparatus of claim 1 wherein said delivery conduit and said spray collar are disposed within the walls of a vertical chute casing, said casing extending downwardly from said spray collar.

3. Apparatus useful in the preparation of sodium carbonate from trona ore when interposed between a delivery means from a calciner and a dissolver means, said apparatus comprising:
  a substantially vertical chute having an inlet at the top, a casing defined by exterior walls extending downwardly from the inlet and an angularly disposed lateral exit port at the lower portion of said casing,
  a spray means mounted peripherally in a recessed housing on said casing angularly aligned with the axis of said exit port to delivery soltuion into said exit port,
  a substantially vertical delivery conduit for the delivery of hot crude sodium carbonate by gravity concentrically disposed at the inlet of said chute casing,
  a spray collar disposed within the walls of said chute casing at the inlet thereof, said spray collar having a central opening of a cross-sectional area slightly greater than said delivery conduit and concentrically positioned around said delivery conduit,
  a plurality of liquid spray nozzles circumferentially disposed on the underside of said spray collar and directed downwardly and inwardly in close proximity of the exit end of said delivery conduit, so constructed that as saturated sodium carbonate solution is sprayed with sufficient force from said spray nozzles a forceful draft of air is drawn through said opening between said delivery conduit and said spray collar so as to prohibit steam produced in the dissolution of hot crude sodium carbonate from contacting said delivery conduit.

4. In the monohydrate process for the preparation of sodium carbonate from trona ore comprising the steps of calcining the trona ore, dissolving the calcined crude sodium carbonate, filtering the resulting solution, crystallizing sodium carbonate monohydrate therefrom and calcining the sodium carbonate monohydrate to dense sodium carbonate, the process for monohydrating hot crude sodium carbonate from the calciner prior to dissolving said crude sodium carbonate, said process comprising:
  delivering said crude sodium carbonate from a calciner by a conveyor means to a substantially vertical delivery conduit around which is concentrically positioned substantially at the delivery end thereof a spray collar having a central opening of a cross sectional area slightly greater than the delivery conduit so that an opening exits between the spray collar and the conduit,
  spraying saturated sodium carbonate solution from a plurality of spray nozzles circumferentially disposed on the underside of said spray collar and directed downwardly and inwardly in close proximity of the exit end of said delivery conduit, with sufficient force to cause a forceful draft of air to be drawn through said opening between said delivery conduit and said spray collar so as to prohibit steam produced by the hydration of the calcined crude sodium carbonate from contacting said delivery conduit.

References Cited

UNITED STATES PATENTS 2,962,348  11/1960  Seglin et al. _____ 23—63
2,967,758  1/1961  Thorson _____ 23—262

OSCAR R. VERTIZ, Primary Examiner

HOKE S. MILLER, Assistant Examiner

U.S. Cl. X.R.

23—262

UNITED STATES PATENT OFFICE
CERTIFICATE OF CORRECTION

Patent No. 3,477,808                Dated Nov. 11, 1969

Inventor(s) Henry D. Hellmers

It is certified that error appears in the above-identified patent and that said Letters Patent are hereby corrected as shown below:

Column 2, line 21, delete "where".

Column 2, line 22, change "aid" to "and"

Column 2 line 62-63 "from a calcinor" should read "from a delivery means from a calcinor".

SIGNED AND SEALED
OCT 6 — 1970

(SEAL)
Attest:

Edward M. Fletcher, Jr.
Attesting Officer

WILLIAM E. SCHUYLER, JR.
Commissioner of Patents